(12) United States Patent
Watanabe et al.

(10) Patent No.: US 12,244,487 B2
(45) Date of Patent: Mar. 4, 2025

(54) TRAFFIC TRANSFERRING DEVICE, SWITCH, TRAFFIC TRANSFERRING METHOD, AND TRAFFIC TRANSFERRING PROGRAM

(71) Applicant: Nippon Telegraph and Telephone Corporation, Tokyo (JP)

(72) Inventors: Yuta Watanabe, Musashino (JP);
Masato Nishiguchi, Musashino (JP);
Yuki Takei, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 414 days.

(21) Appl. No.: 17/634,790

(22) PCT Filed: Aug. 14, 2019

(86) PCT No.: PCT/JP2019/031975
§ 371 (c)(1),
(2) Date: Feb. 11, 2022

(87) PCT Pub. No.: WO2021/029044
PCT Pub. Date: Feb. 18, 2021

(65) Prior Publication Data
US 2022/0345395 A1 Oct. 27, 2022

(51) Int. Cl.
*H04L 45/00* (2022.01)
*H04L 45/7453* (2022.01)

(52) U.S. Cl.
CPC .......... *H04L 45/22* (2013.01); *H04L 45/7453* (2013.01)

(58) Field of Classification Search
CPC ...... H04L 45/22; H04L 45/7453; H04L 12/44
See application file for complete search history.

(56) References Cited

U.S. PATENT DOCUMENTS

2018/0359177 A1* 12/2018 Sorenson, III ...... H04L 43/0817

OTHER PUBLICATIONS

Cisco Systems G.K., "ASA cluster," Cisco ASA Series 9.6 CLI Configuration Guide (General Operation), retrieved on Jul. 8, 2019, retrieved from URL <https://www.cisco.com/c/ja_jp/td/docs/security/asa/asa96/configuration/general/asa-96-general-config/asa-96-general-config_chapter_01000.html>, 208 pages (with English Translation).

* cited by examiner

*Primary Examiner* — Mandish K Randhawa
(74) *Attorney, Agent, or Firm* — Fish & Richardson P.C.

(57) ABSTRACT

A traffic transfer system includes a switch (10) and a switch (20) and distributes and transfers traffic of communication on a network to a plurality of devices. The switch (10) determines a device of a transfer destination of input traffic among a plurality of devices by a hash function. The switch (10) transfers traffic to a first device when the first device determined to be a transfer destination is available and transfers traffic to the switch (20) when the first device is not available. The switch (20) determines a device to which the traffic transferred by the switch (10) is transferred, from available devices by a hash function. The switch (20) transfers the traffic to a second device determined to be a transfer destination.

4 Claims, 19 Drawing Sheets

TRAFFIC TRANSFERRING DEVICE, SWITCH, TRAFFIC TRANSFERRING METHOD, AND TRAFFIC TRANSFERRING PROGRAM

CROSS-REFERENCE TO RELATED APPLICATIONS

This application is a National Stage application under 35 U.S.C. § 371 of International Application No. PCT/JP2019/031975, having an International Filing Date of Aug. 14, 2019, the disclosure of which is considered part of the disclosure of this application, and is incorporated in its entirety into this application.

TECHNICAL FIELD

The present invention relates to a traffic transfer system, a switch, a traffic transfer method, and a traffic transfer program.

BACKGROUND ART

A technique called "N-act" is conventionally known as a method of easily scaling the performance of an appliance device or the like in a network or a method of continuing a service even when a failure occurs. N-act evenly distributes traffic to a plurality of appliance devices using a hash function of a switch and performs further hashing (rehashing) excluding a failed device when a failure occurs in the appliance device. Additionally, the hash function is a function of determining a device to which traffic is transferred by using, for example, a destination address and a source address of traffic.

CITATION LIST

Non Patent Literature

NPL 1: "ASA cluster", Cisco ASA series 9. 6 CLI Configuration Guide (URL: https://www.cisco.com/c/ja_jp/td/docs/security/asa/asa96/configuration/general/asa-96-general-config/asa-96-general-config_chapter_01000.html)

SUMMARY OF THE INVENTION

Technical Problem

However, in the conventional technique, a problem arises in that session interruption may occur when some appliance devices become unavailable. For example, in N-act, all traffic is rehashed when rehashing is performed. As a result, there is a probability that most sessions may be interrupted particularly in the appliance device that manages the session state.

Means for Solving the Problem

In order to solve the above-described problems and achieve the object, there is provided is a traffic transfer system including first and second switches and distributing and transferring traffic of communication on a network to a plurality of devices. The first switch includes a first determination unit which determines a device to which input traffic is transferred, from a plurality of devices by a hash function, and a first transfer unit which transfers the traffic to a first device when the first device determined to be a transfer destination by the first determination unit is available, and transfers the traffic to the second switch when the first device is not available. The second switch includes a second determination unit which determines a device to which the traffic transferred by the first transfer unit is transferred, from among the devices obtained by excluding the first device from the plurality of devices by a hash function, and a second transfer unit which transfers the traffic to a second device determined to be a transfer destination by the second determination unit.

Effects of the Invention

According to the present invention, it is possible to reduce the occurrence of session interruption in the appliance device.

DESCRIPTION OF EMBODIMENTS

Hereinafter, embodiments of a traffic transfer system, a switch, a traffic transfer method, and a traffic transfer program according to the present application will be described in detail with reference to the drawings. Additionally, the present invention is not limited to the embodiments to be described below.

First Embodiment

Figure 1:
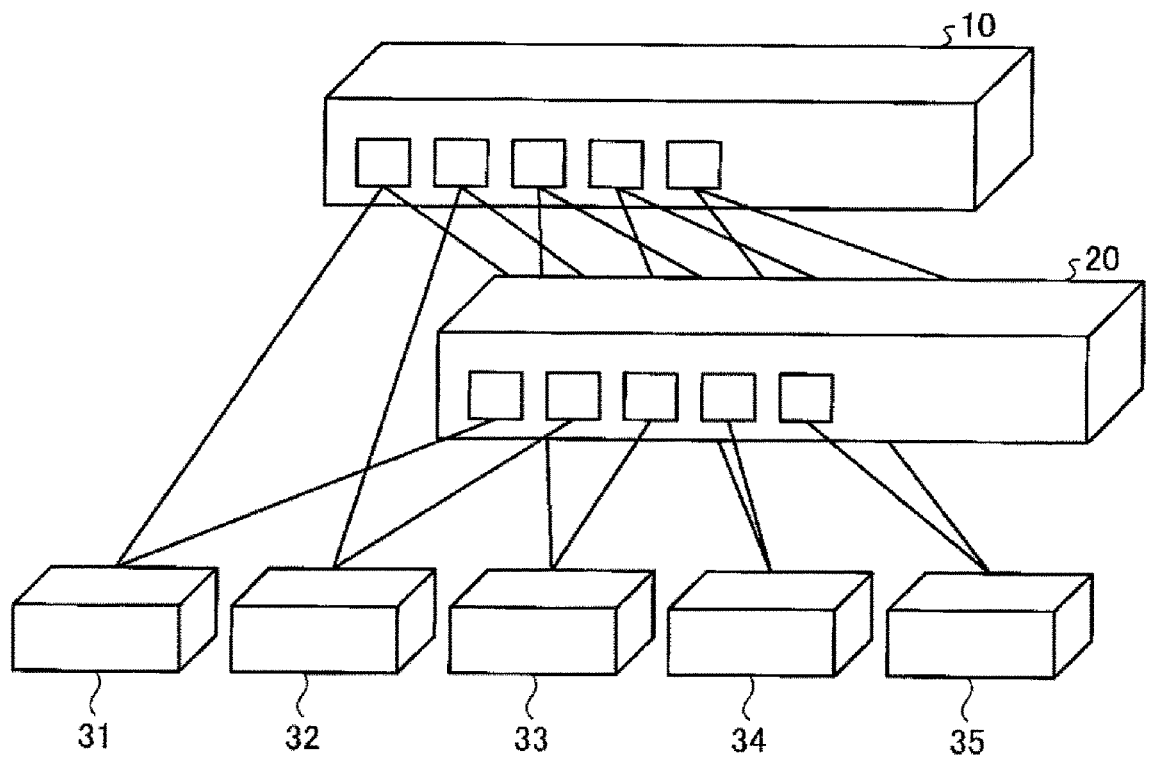
FIG. 1 is a diagram illustrating a configuration example of a traffic transfer system according to a first embodiment.

First, a configuration of a traffic transfer system according to a first embodiment will be described with reference to FIG. 1. FIG. 1 is a diagram illustrating a configuration example of the traffic transfer system according to the first embodiment. As illustrated in FIG. 1, the transfer system includes a switch 10 and a switch 20. Further, the switch 10 and the switch 20 are connected to appliance devices (APPs) 31, 32, 33, 34, and 35.

Here, each appliance device is a device having a predetermined function such as a firewall and a virtual private network (VPN). Further, it is assumed that all appliance devices illustrated in FIG. 1 have the same function. That is, even when the switch transfers traffic to any of the appliance devices, services provided by the traffic do not change. In addition, the number of the appliance devices is preferably two or more and is not limited to the number illustrated in the drawings.

The switch 10 is an example of a first switch. Further, the switch 20 is an example of a second switch. Further, the traffic includes, for example, IP packets. The traffic transfer system distributes and transfers the traffic of communication on the network to a plurality of devices by the switch 10 and the switch 20. Here, the switch 10 and the switch 20 perform traffic distribution transfer by a hash function based on the address of the destination or source of the traffic.

Figure 2:
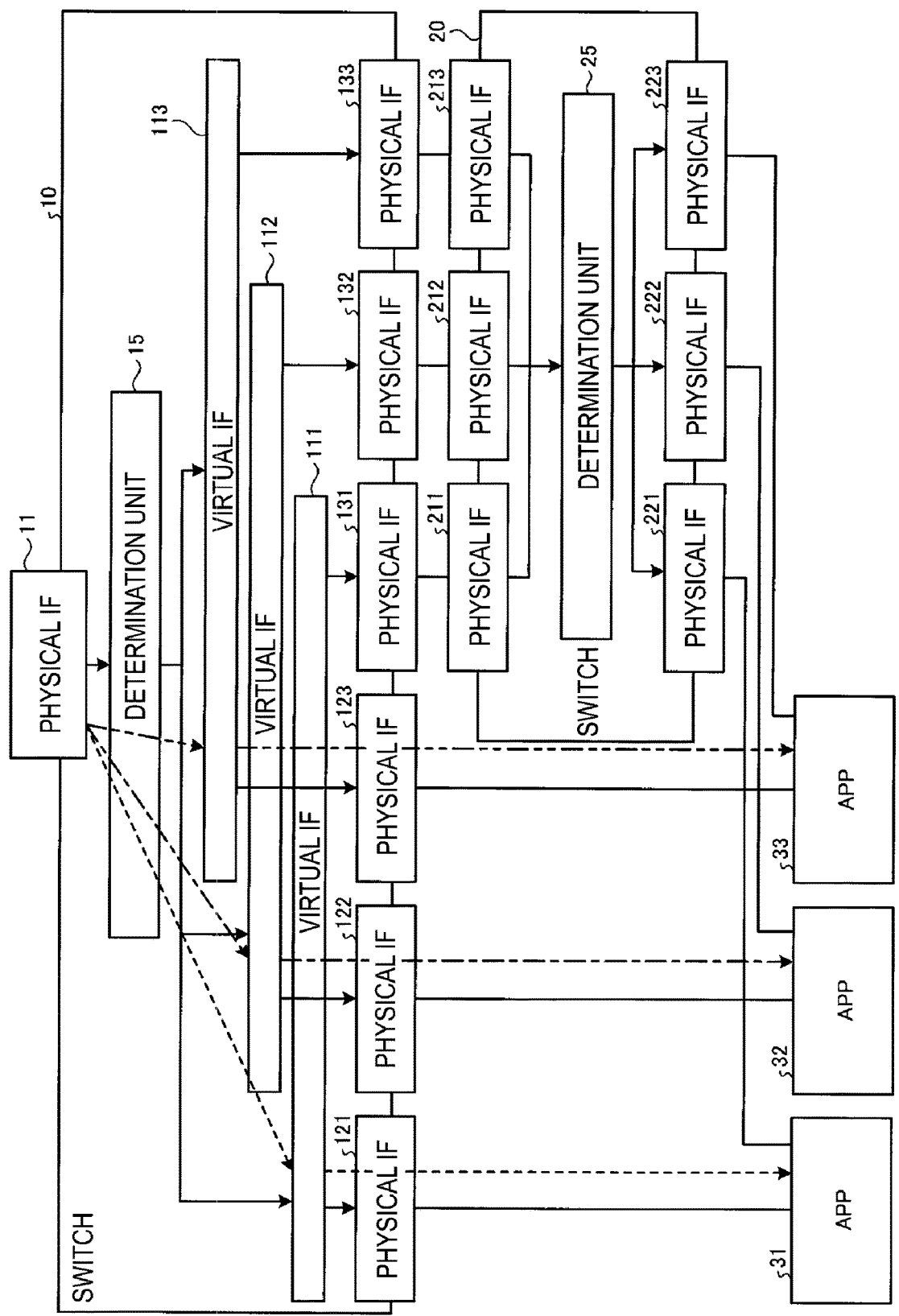
FIG. 2 is a diagram illustrating a flow of traffic during a normal operation.
Figure 3:
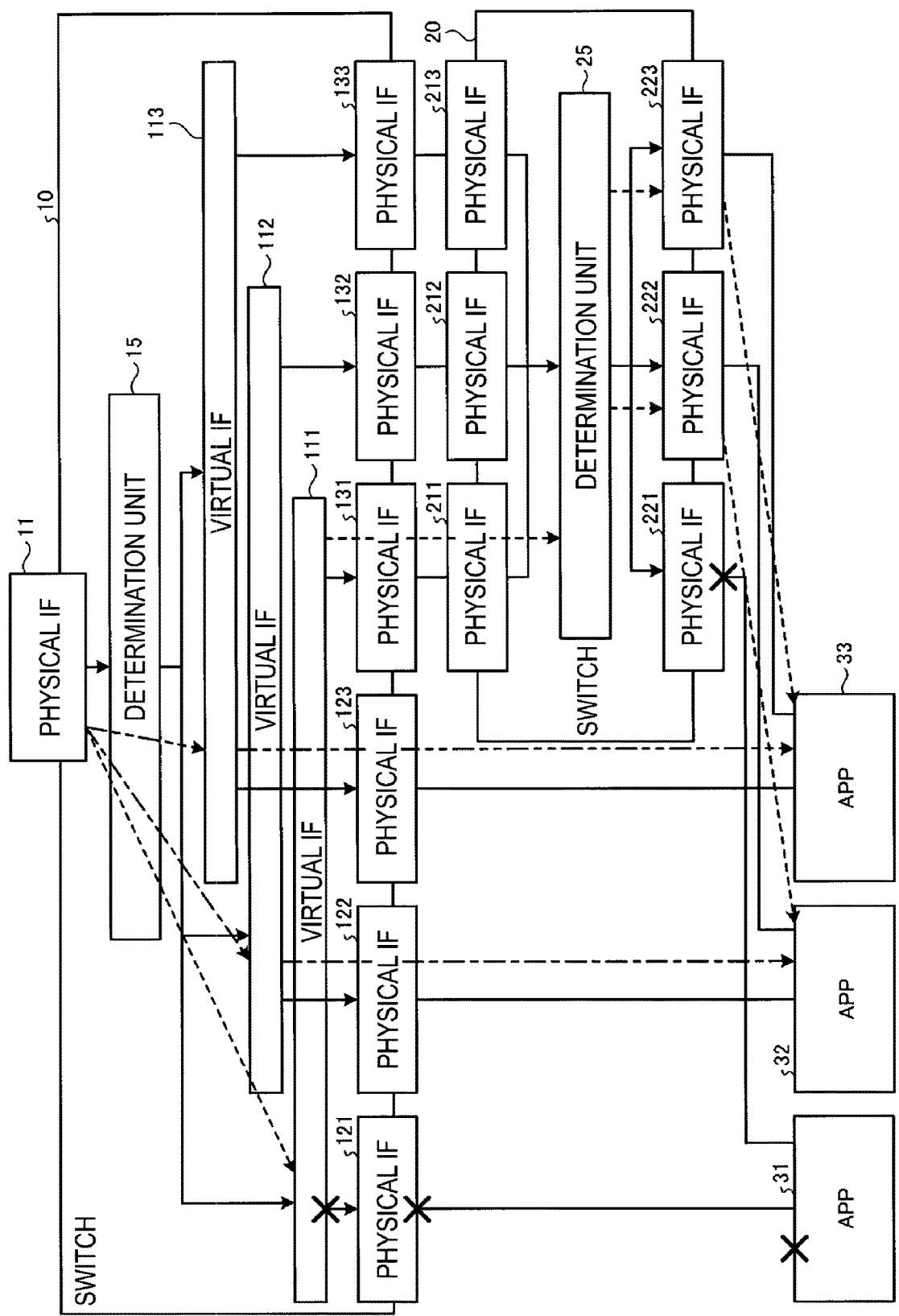
FIG. 3 is a diagram illustrating a flow of traffic when a failure occurs.

A flow of traffic during a normal operation and when a failure occurs will be described with reference to FIGS. 2 and 3. FIG. 2 is a diagram illustrating a flow of traffic during a normal operation. Further, FIG. 3 is a diagram illustrating a flow of traffic when a failure occurs.

In the description below, it is assumed that the traffic input to a certain physical interface (IF) is transferred to another physical IF provided to face the physical IF by a wired connection or the like. Further, the virtual IF is a logically set IF and the traffic can be transferred to any of a plurality of IFs according to the priority. In addition, the physical IF and the virtual IF are examples of the transfer unit.

First, a configuration of the switch 10 and the switch 20 will be described with reference to FIG. 2. As illustrated in FIG. 2, the switch 10 includes physical IFs 11, 121, 122, 123, 131, 132, and 133. Further, the switch 10 includes virtual IFs 111, 112, and 113. Further, the switch 10 includes a determination unit 15. Further, as illustrated in FIG. 3, the switch 20 includes physical IFs 211, 212, 213, 221, 222, and 223. Further, the switch 20 includes a determination unit 25.

The physical IF 11 receives the input of the traffic from other devices on the network. The determination unit 15 determines a device to which the input traffic is transferred by a hash function among a plurality of devices.

When a first device which is determined to be a transfer destination by the determination unit 15 is available, the switch 10 transfers the traffic to the device. Meanwhile, when the device is not available, the switch 10 transfers the traffic to the switch 20. In addition, when the switch 10 and the switch 20 detect the disconnection of the link with the appliance device, it is determined that the appliance device is not available. Here, when the determination unit 15 determines the APP 31 as the transfer destination, the traffic is passed to the virtual IF 111.

For example, as illustrated in FIG. 2, when the APP 31 is determined to be the transfer destination by the determination unit 15 and the APP 31 is available, the virtual IF 111 transfers the traffic to the physical IF 121. Then, the physical IF 121 transfers the traffic to the APP 31.

On the other hand, as illustrated in FIG. 3, when the APP 31 is determined to be the transfer destination by the determination unit 15 and the APP 31 is not available due to a failure or the like, the virtual IF 111 transfers the traffic to the physical IF 131. Then, the physical IF 131 transfers the traffic to the physical IF 211 of the opposite switch 20.

The determination unit 25 determines the device to which the traffic transferred by the switch 10 is transferred, from the available devices by the hash function. Then, the switch 20 transfers the traffic to the second device which is determined to be the transfer destination by the determination unit 25.

As described above, the switch 20 can determine whether the appliance device is available by detecting link disconnection. Thus, the switch 20 determines the traffic transfer destination for the appliance devices which are determined to be available or the devices which are obtained by excluding the device determined not to be available from all devices.

In the example of FIG. 3, the determination unit 25 determines, by the hash function, the device to which the traffic transferred by the switch 10 is transferred, from among the devices other than the APP31 among a plurality of the devices, that is, from among the APP 32 and the APP 33. Then, the physical IF 222 or 223 transfers the traffic to the APP 32 or the APP 33 which is determined to be the transfer destination by the determination unit 25.

Modified Example of First Embodiment

Figure 4:
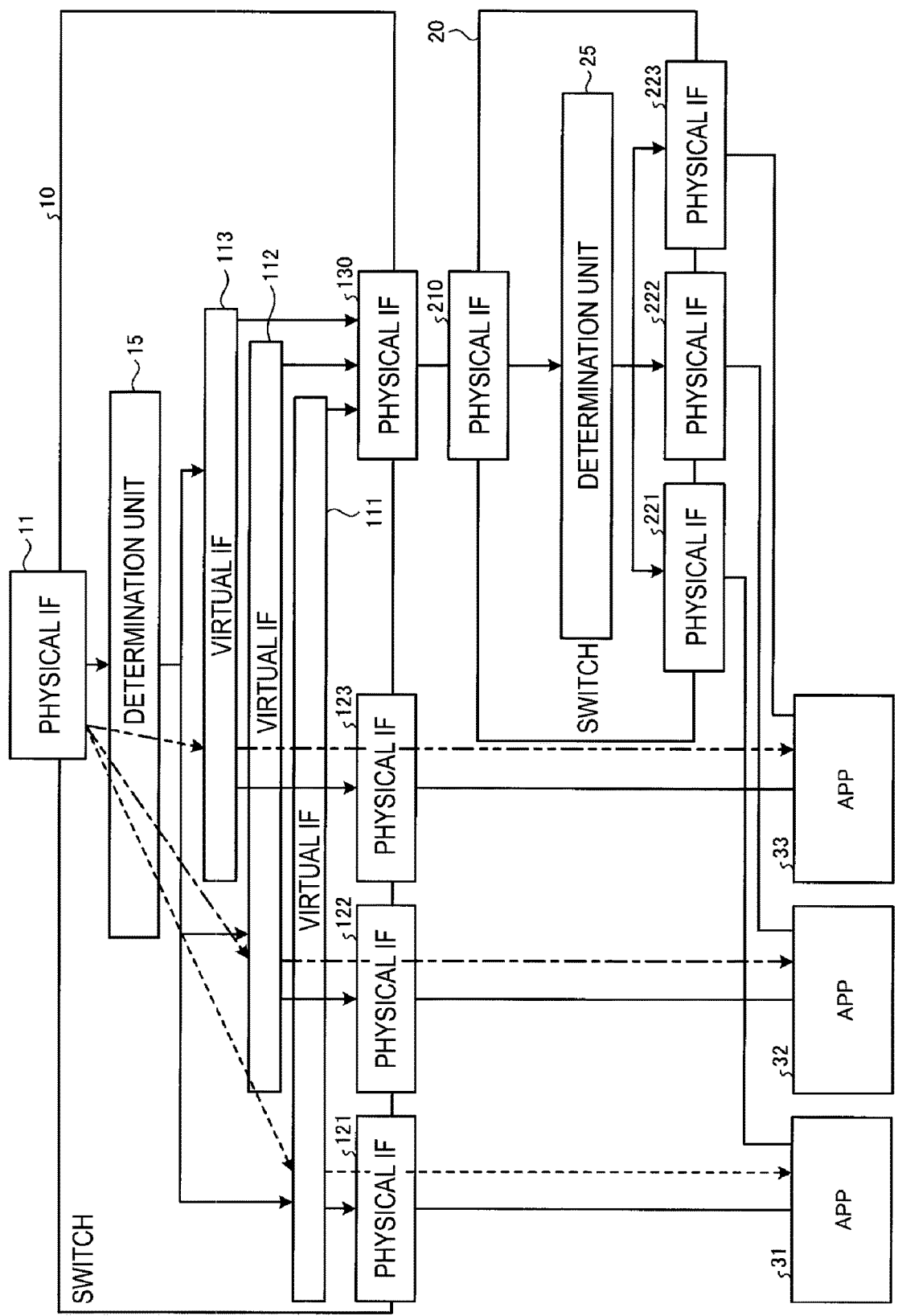
FIG. 4 is a diagram illustrating a flow of traffic during a normal operation in a modified example.

In the example of FIGS. 2 and 3, the physical IF corresponding to the switch 20 was prepared for each appliance device that is the transfer destination. On the other hand, as illustrated in FIG. 4, one physical IF may be provided between the switch 10 and the switch 20. FIG. 4 is a diagram illustrating a flow of traffic during a normal operation in a modified example. As illustrated in FIG. 4, the switch 10 includes a physical IF 130 in addition to the physical IFs 11, 121, 122, and 123. Further, the switch 20 includes a physical IF 210 facing the physical IF 130.

Figure 5:
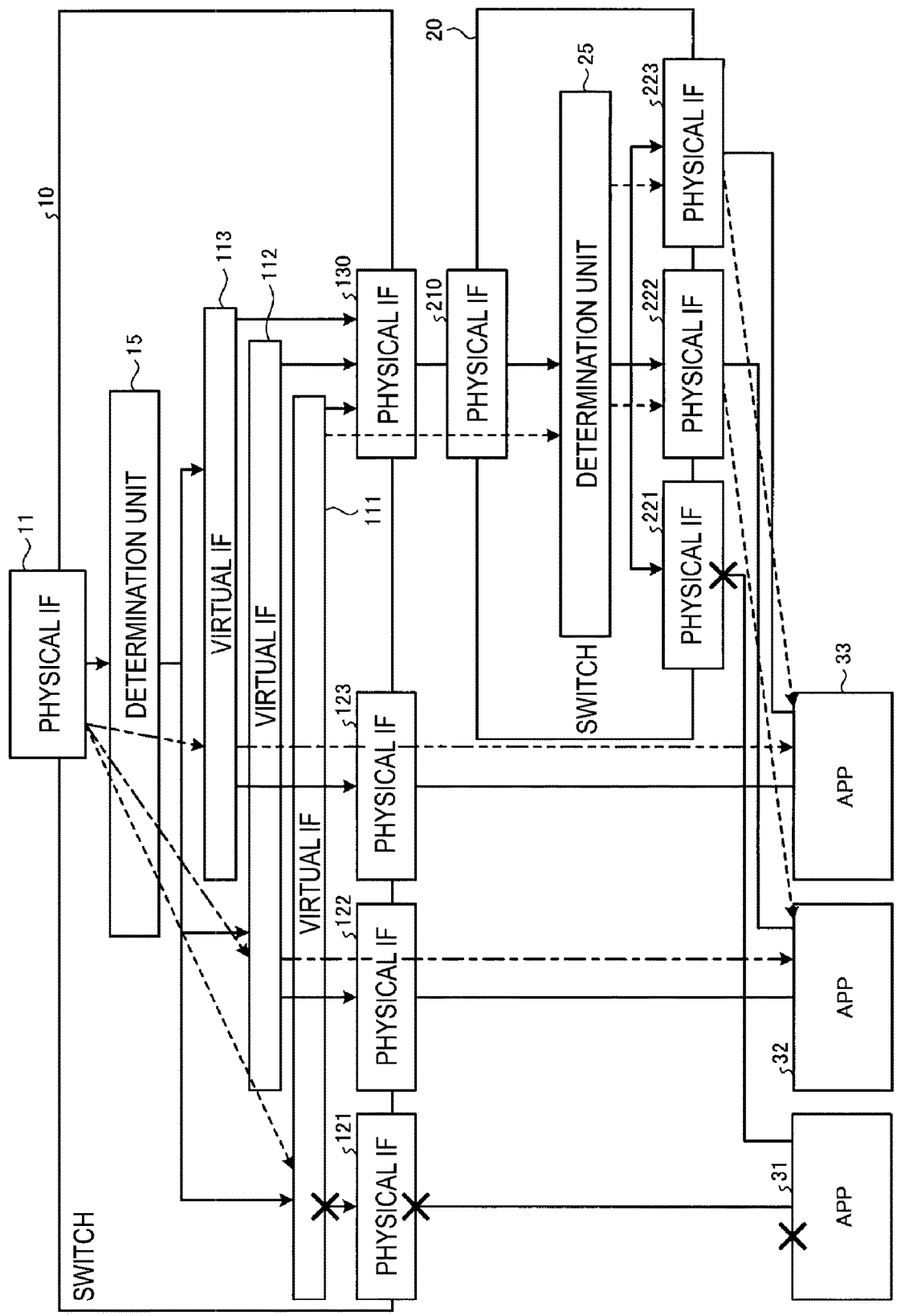
FIG. 5 is a diagram illustrating a flow of traffic when a failure occurs in the modified example.

In this case, as illustrated in FIG. 5, the switch 10 transfers the traffic to the switch 20 via the physical IF 130 regardless of the appliance device to which the traffic is transferred. Then, the physical IF 210 passes the traffic transferred from the switch 10 to the determination unit 25. FIG. 5 is a diagram illustrating a flow of traffic when a failure occurs in the modified example.

Flow of Process of First Embodiment

Figure 6:
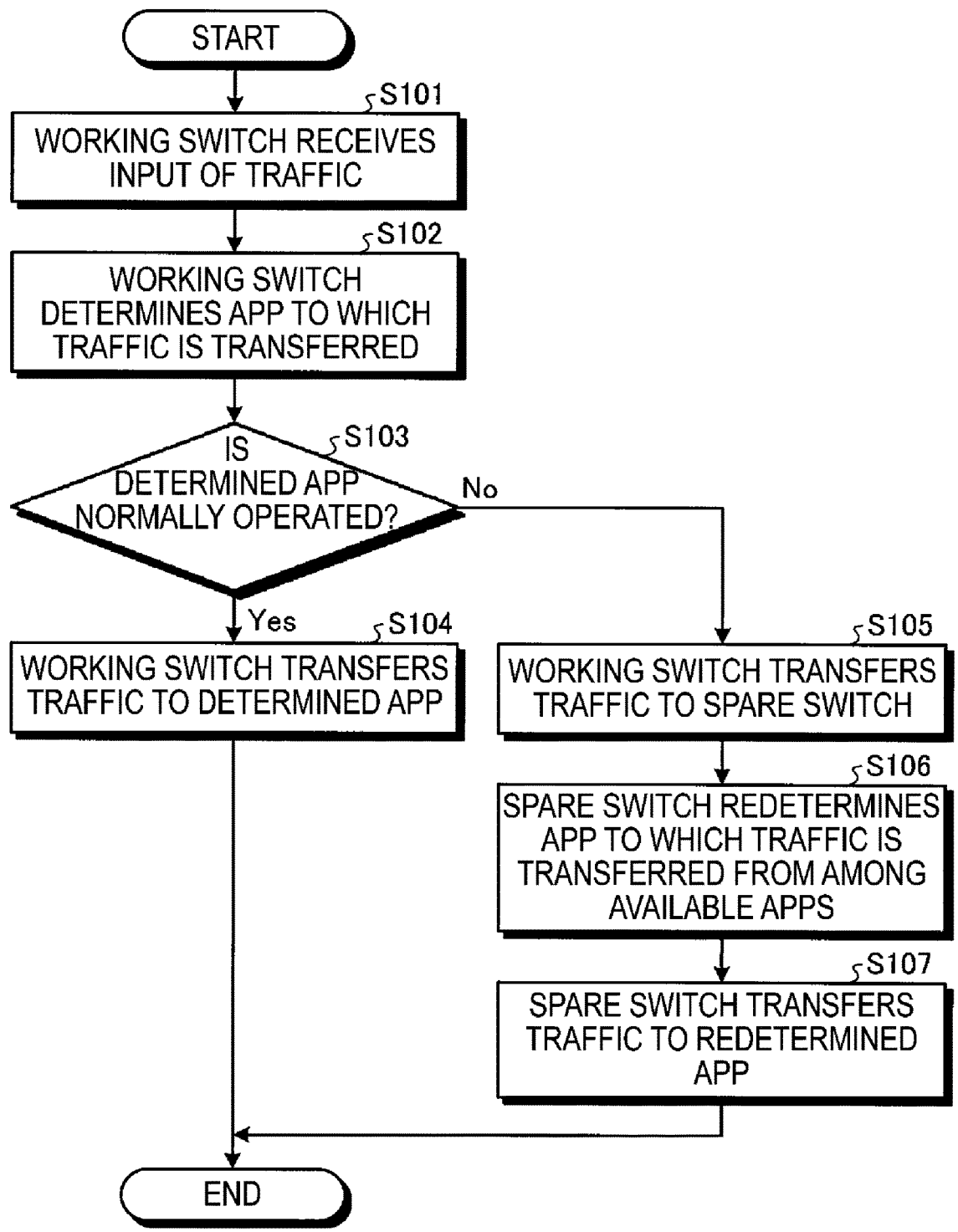
FIG. 6 is a flowchart illustrating a flow of a process of the traffic transfer system according to the first embodiment.

A flow of a process of the traffic transfer system will be described with reference to FIG. 6. FIG. 6 is a flowchart illustrating a flow of a process of the traffic transfer system according to the first embodiment. In the description below, the switch 10 and the switch 20 may be respectively referred to as a working switch and a spare switch.

As illustrated in FIG. 6, first, the working switch receives input of the traffic (step S101). Next, the working switch determines the appliance device (APP) to which the traffic is transferred by the hash function (step S102). Here, when the determined APP is normally operated (step S103, Yes), the working switch transfers the traffic to the determined APP (step S104).

On the other hand, when the determined APP is not normally operated (step S103, No), the working switch transfers the traffic to the spare switch (step S105). Here, the spare switch redetermines the APP to which the traffic is transferred, from among the APPs other than the determined APP by the hash function (step S106). Then, the spare switch transfers the traffic to the redetermined APP (step S107).

Effect of First Embodiment

As described above so far, in the first embodiment, the traffic transfer system includes the switch 10 and the switch 20 and distributes and transfers the traffic of communication on a network to a plurality of devices. The switch 10 determines the device to which the input traffic is transferred, from among a plurality of devices by the hash function. When the first device which is determined to be the transfer destination is available, the switch 10 transfers the traffic to the first device. Meanwhile, when the first device is not available, the switch 10 transfers the traffic to the switch 20. The switch 20 determines the device to which the traffic transferred by the switch 10 is transferred, from among the available devices by the hash function. The switch 20 transfers the traffic to the second device which is determined to be the transfer destination.

For example, even when one of the appliance devices becomes unavailable due to a failure, the traffic transfer system can bypass the traffic without affecting the session between the other appliance devices. For this reason, according to the first embodiment, it is possible to reduce the occurrence of session interruption in the appliance device.

As another method of reducing the occurrence of session interruption in the appliance device, it is conceivable to specify a plurality of appliance devices as distribution destinations together with priorities for each source IP address. However, in this method, it is difficult to make settings for even distribution when the appliance device has a function that enables access from an unspecified number of IP addresses, the address range of the access source is increased or decreased, or the usage rate is biased within the range.

Further, as another method of reducing the occurrence of session interruption in the appliance device, a method of using a load balancer is conceivable. Generally, because each load balancer having an Act/Sby type configuration manages each session state, only the session that was transferred to the appliance device in which a failure occurred can be transferred to another appliance device when the failure occurs. On the other hand, because the performance of the load balancer itself becomes a bottleneck and needs to be renewed when there is unexpected traffic growth, it is necessary to use a large load balancer with sufficient performance margin. As a result, the cost increases.

Second Embodiment

The traffic transfer system of the first embodiment includes two switches. On the other hand, in a second embodiment, a reduction of the occurrence of session interruption in the appliance device is realized by one switch.

Figure 7:
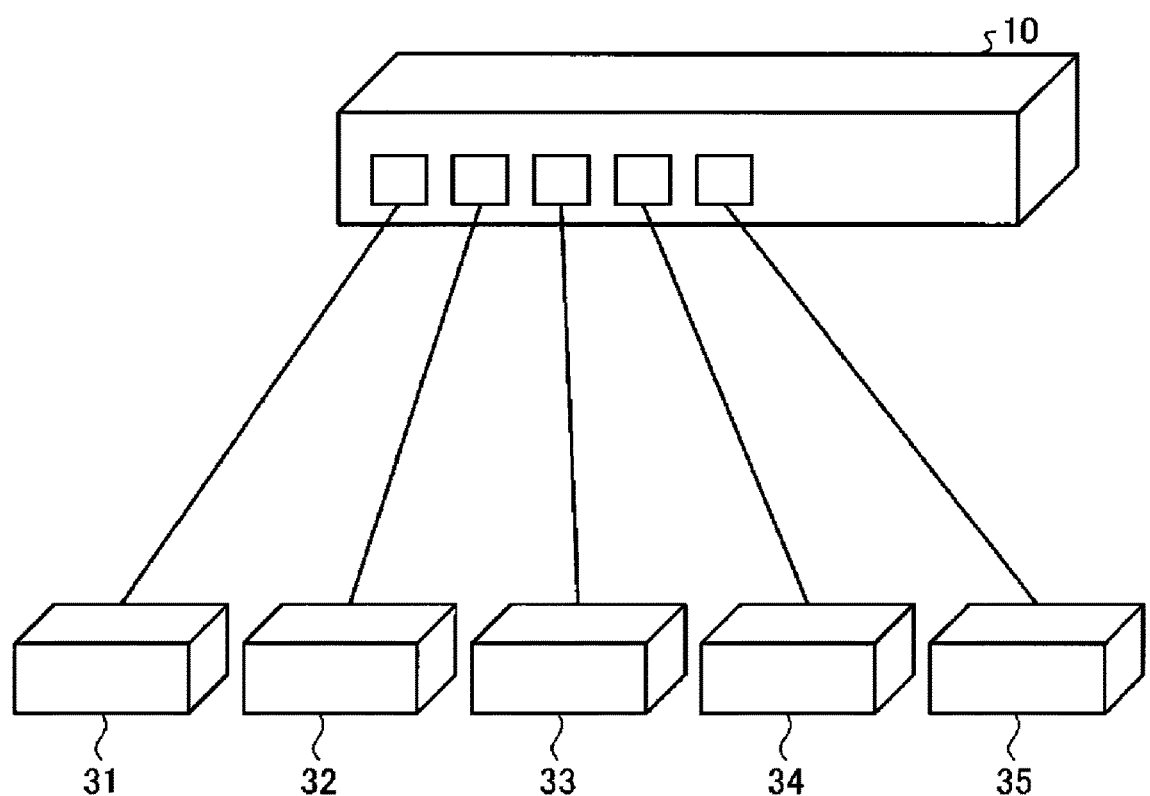
FIG. 7 is a diagram illustrating a configuration example of a traffic transfer system according to a second embodiment.

A configuration of a traffic transfer system according to the second embodiment will be described with reference to FIG. 7. FIG. 7 is a diagram illustrating a configuration example of the traffic transfer system according to the second embodiment. As illustrated in FIG. 7, the switch 10 is connects to the appliance devices (APPs) 31, 32, 33, 34, and 35.

Here, the basic functions of the switch 10 and each appliance device are the same as those of the first embodiment. In the description below, a difference of the switch 10 in the first embodiment and the second embodiment will be mainly described.

Figure 8:
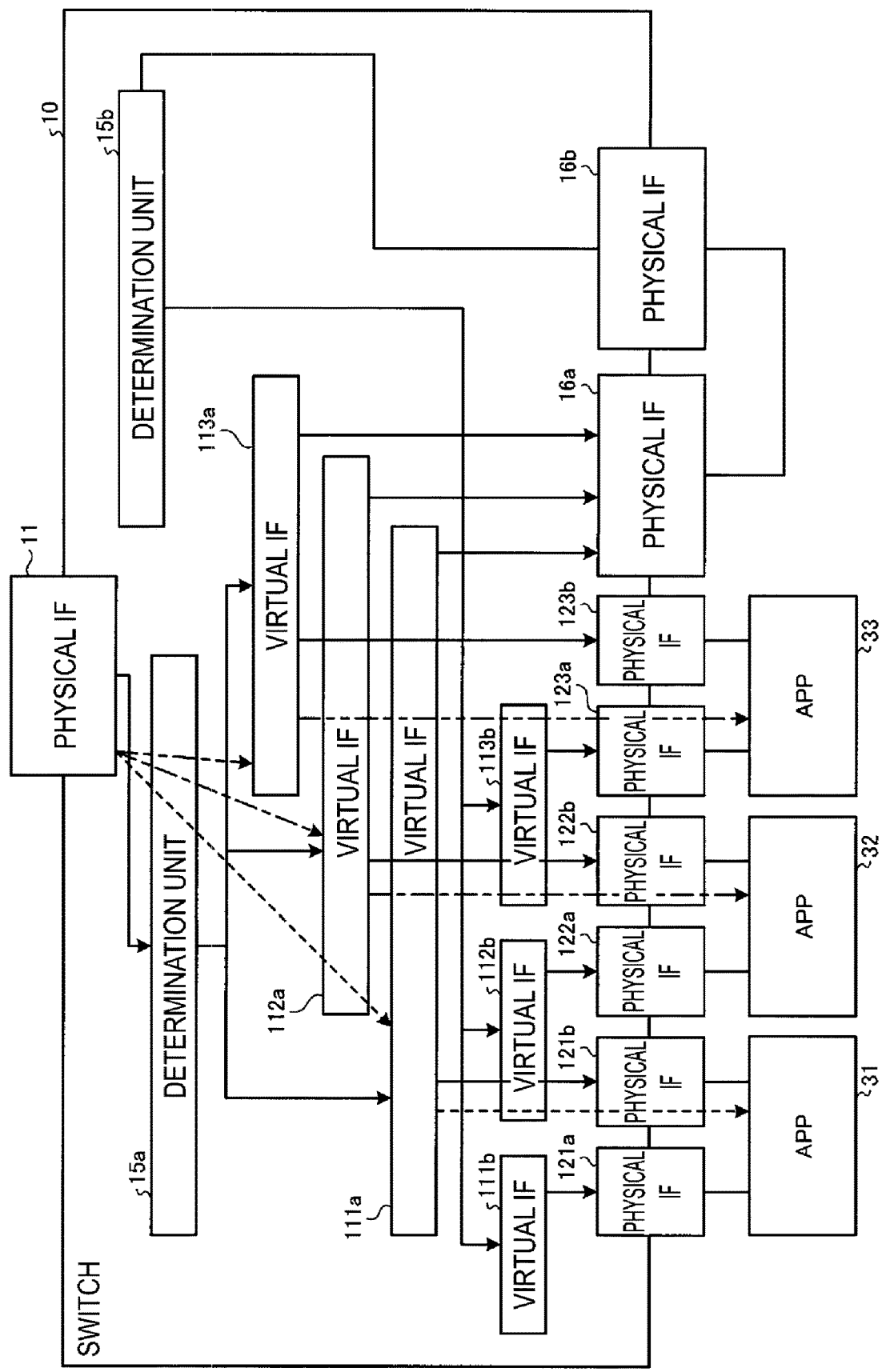
FIG. 8 is a diagram illustrating a flow of traffic during a normal operation.
Figure 9:
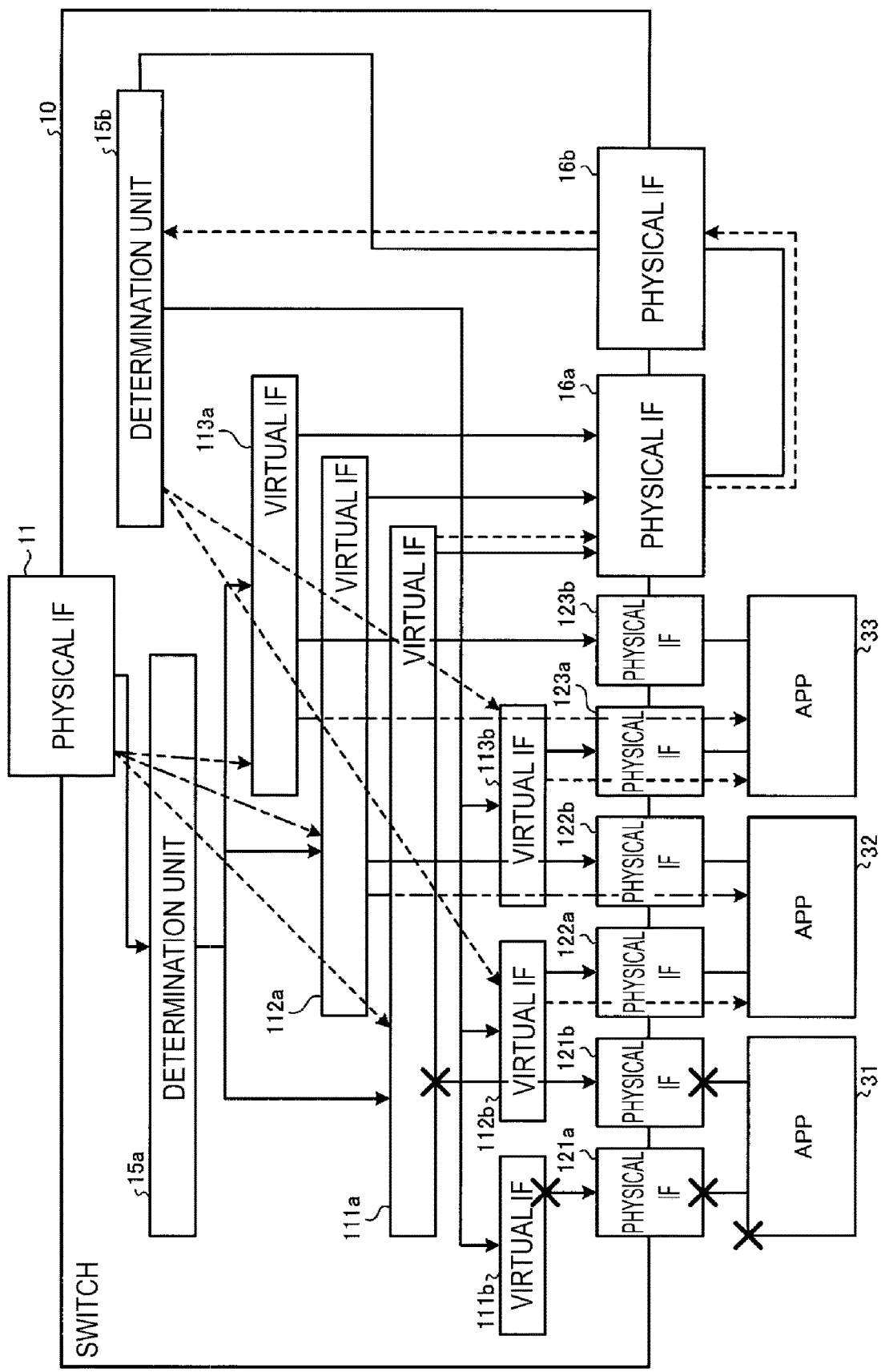
FIG. 9 is a diagram illustrating a flow of traffic when a failure occurs.

A flow of traffic during a normal operation and when a failure occurs will be described with reference to FIGS. 8 and 9. FIG. 8 is a diagram illustrating a flow of traffic during a normal operation. Further, FIG. 9 is a diagram illustrating a flow of traffic when a failure occurs.

As illustrated in FIG. 8, the switch 10 includes a determination unit 15a and a determination unit 15b. Further, the switch 10 includes physical IFs 121a, 121b, 122a, 122b, 123a, 123b, 16a, and 16b. Further, the switch 10 includes virtual IFs 111a, 112a, 113a, 111b, 112b, and 113b.

Here, the determination unit 15a determines the device to which the input traffic is transferred, from among a plurality of devices by the hash function. Further, when a first device of the plurality of devices determined to be the transfer destination by the determination unit 15a is available, the switch 10 transfers the traffic to the first device.

For example, as illustrated in FIG. 8, when the APP 31 is determined to be the transfer destination by the determination unit 15a and the APP 31 is available, the virtual IF 111a transfers the traffic to the physical IF 121b. Then, the physical IF 121b transfers the traffic to the APP 31.

On the other hand, as illustrated in FIG. 9, when the APP 31 is determined to be the transfer destination by the determination unit 15 and the APP 31 is not available due to a failure or the like, the virtual IF 111a transfers the traffic to the physical IF 16a. Then, the physical IF 16a transfers the traffic to the opposite physical IF 16b.

When the first device is not available, the determination unit 15b determines the device to which the traffic is transferred, from among the available devices by the hash function. Then, the switch 10 transfers the traffic to the second device which is determined to be the transfer destination by the determination unit 15b.

Further, passing the traffic from the determination unit 15a to the determination unit 15b is realized by the physical IF 16a and the physical IF 16b. When the first device which is determined to be the transfer destination by the determination unit 15a is not available, the switch 10 outputs the traffic from the physical IF 16a. Then, the determination unit 15b determines the device to which the traffic output from the physical IF 16a and input to the physical IF 16b is transferred. As described above, the way in which one device includes two IFs, and the input of the traffic output from one IF is received from the other IF is called an "external loopback".

In the example of FIG. 9, the determination unit 15b determines the device to which the traffic transferred by the switch 10 is transferred, from the devices other than the APP31 among the plurality of devices, that is, the APP32 and the APP33, by the hash function. Then, the physical IF 222 or the physical IF 223 transfers the traffic to the APP 32 or the APP 33 which is determined to be the transfer destination by the determination unit 25.

Modified Example of Second Embodiment

Figure 10:
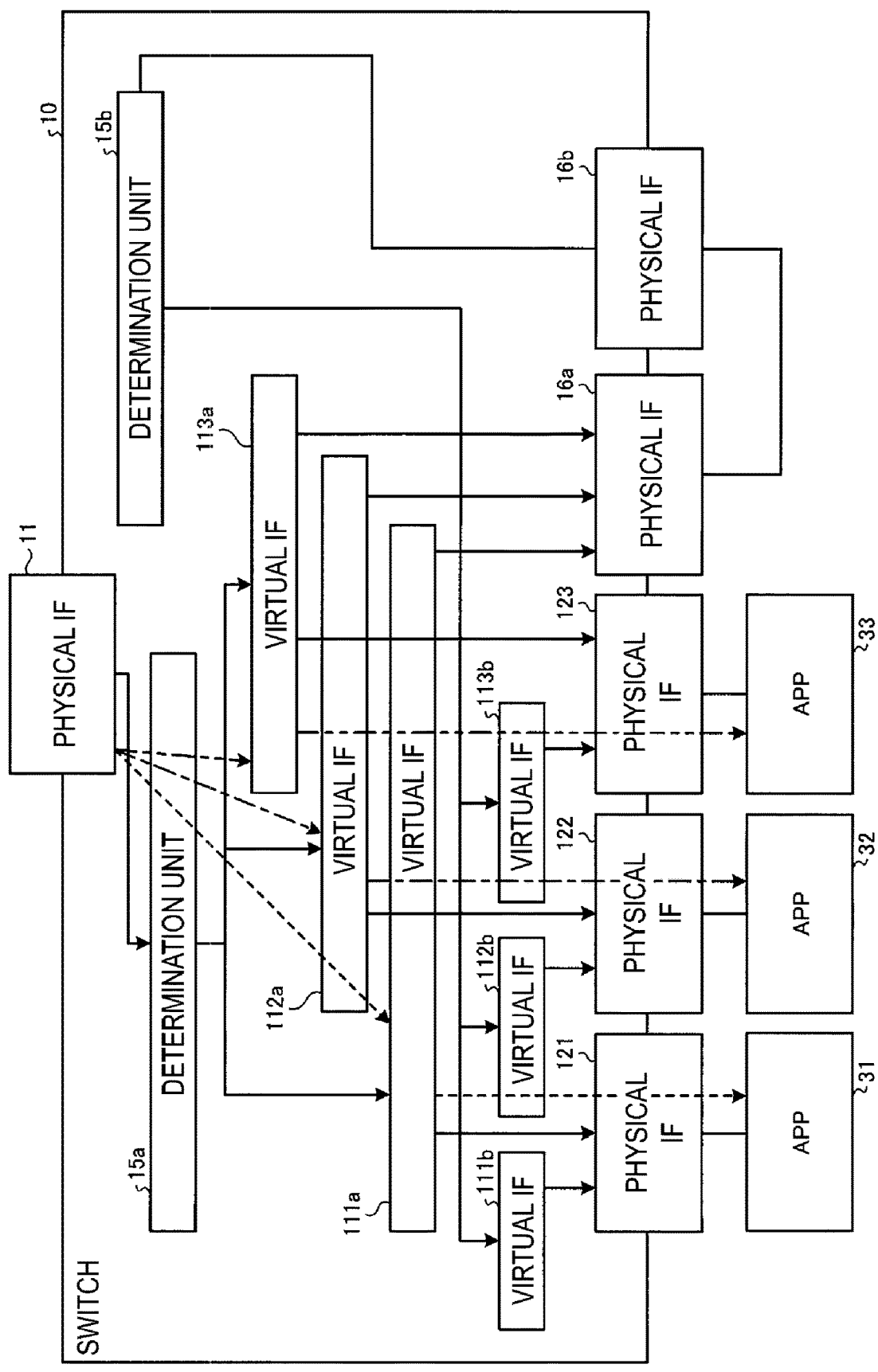
FIG. 10 is a diagram illustrating a flow of traffic during a normal operation in a modified example.

In the examples of FIGS. 8 and 9, the physical IF is prepared for each appliance device of transfer destination in the switch 10. On the other hand, as illustrated in FIG. 10, one physical IF may be provided between the switch 10 and each appliance device. FIG. 10 is a diagram illustrating a flow of traffic during a normal operation in a modified example. As illustrated in FIG. 10, the switch 10 includes physical IFs 121, 122, and 123 in addition to the physical IFs 11, 16a, and 16b.

Figure 11:
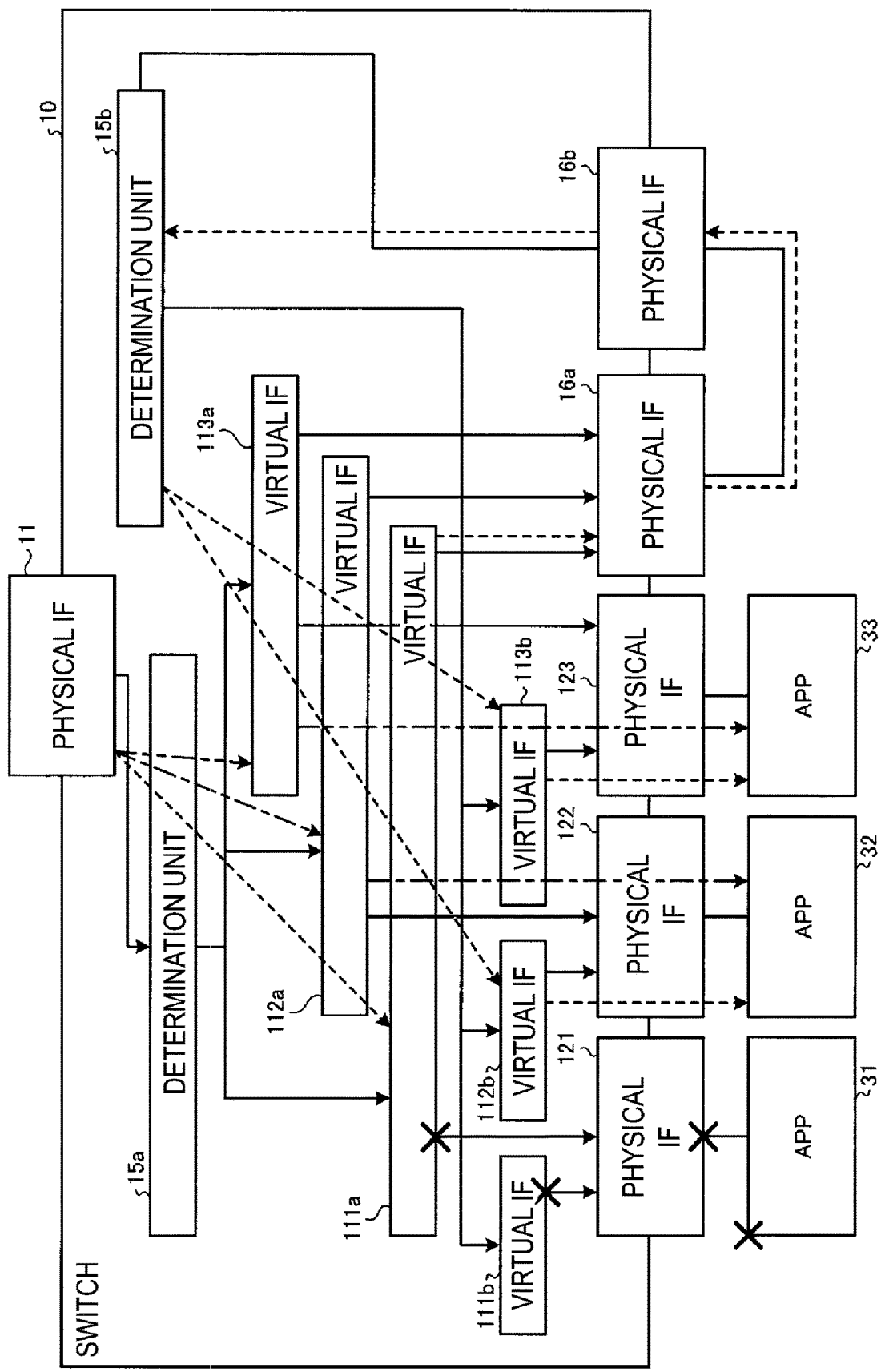
FIG. 11 is a diagram illustrating a flow of traffic when a failure occurs in the modified example.

In this case, as illustrated in FIG. 11, the switch 10 transfers the traffic to each appliance device via the physical IFs 121, 122, and 123 regardless of the normal operation or the failure. For example, when the APP 31 is normally operated, the switch 10 transfers the traffic to the APP 31 via the physical IF 121. Further, when a failure occurs in the APP 31, the switch 10 transfers the traffic to the APP 32 or the APP 33 via the physical IF 122 or 123.

Flow of Process of Second Embodiment

Figure 12:
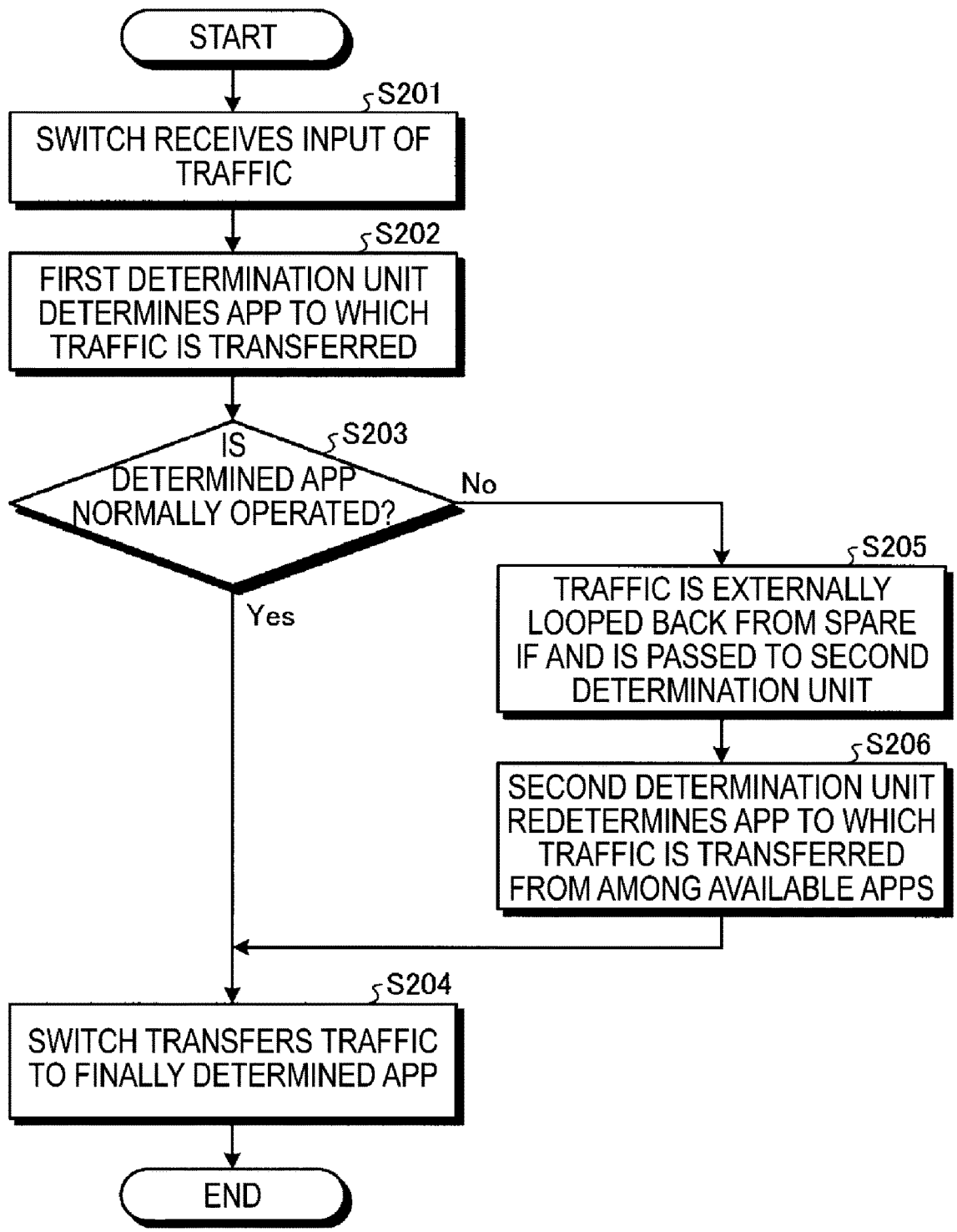
FIG. 12 is a flowchart illustrating a flow of a process of a switch according to the second embodiment.

A flow of a process of the traffic transfer system will be described with reference to FIG. 12. FIG. 12 is a flowchart illustrating a flow of a process of a switch according to the second embodiment.

As illustrated in FIG. 12, first, the switch receives the input of the traffic (step S201). Next, the first determination unit determines the appliance device (APP) to be the transfer destination by the hash function (step S202). Here, when the determined APP is normally operated (step S203, Yes), the switch transfers the traffic to the finally determined APP (step S204). Additionally, the finally determined APP is the APP determined in step S202 or the APP redetermined in step S206.

On the other hand, when the determined APP is not normally operated (step S203, No), the switch passes the traffic to the second determination unit by externally looping back the traffic from the spare IF (step S205). Here, the spare IF is, for example, the physical IFs 16a and 16b. Further, the first determination unit and the second determination unit are respectively the determination unit 15a and the determination unit 15b.

Here, the second determination unit redetermines the APP to which the traffic is transferred, from among the APPs other than the determined APP, by the hash function (step S206). Then, the switch transfers the traffic to the determined or redetermined APP (step S204).

Effect of Process of Second Embodiment

As described above so far, in the second embodiment, the determination unit 15a of the switch 10 determines the device to which the input traffic is transferred, from among a plurality of devices by the hash function. When the first device which is determined to be the transfer destination by the determination unit 15a is available, the switch 10 transfers the traffic to the first device. When the first device is not available, the determination unit 15b determines the device to which the traffic is transferred, from among the available devices by the hash function. The switch 10 transfers the traffic to the second device which is determined to be the transfer destination by the determination unit 15b.

In this way, according to the second embodiment, it is possible to realize the same function as the traffic transfer system by one switch while two switches are used in the first embodiment.

Further, the switch 10 includes the physical IF 16a and the physical IF 16b to which the traffic output from the physical IF 16a is input. The determination unit 15a determines the device to which the input traffic is transferred, from among a plurality of devices by the hash function. When the first device which is determined to be the transfer destination by the determination unit 15a is not available, the switch 10 outputs the traffic from the physical IF 16a. The determination unit 15b determines the device to which the traffic output from the physical IF 16a and input to the physical IF 16b is transferred. In this way, it is possible to realize the same function as the traffic transfer system by one switch using the external loopback.

Third Embodiment

It can be said that the second embodiment realizes a plurality of hash functions in one switch using the external loopback. On the other hand, in a third embodiment, a plurality of hash functions are realized in one switch as a logical configuration using Programming Protocol-Independent Packet Processors (P4, see URL: https://p4.org/) or the like.

Figure 13:
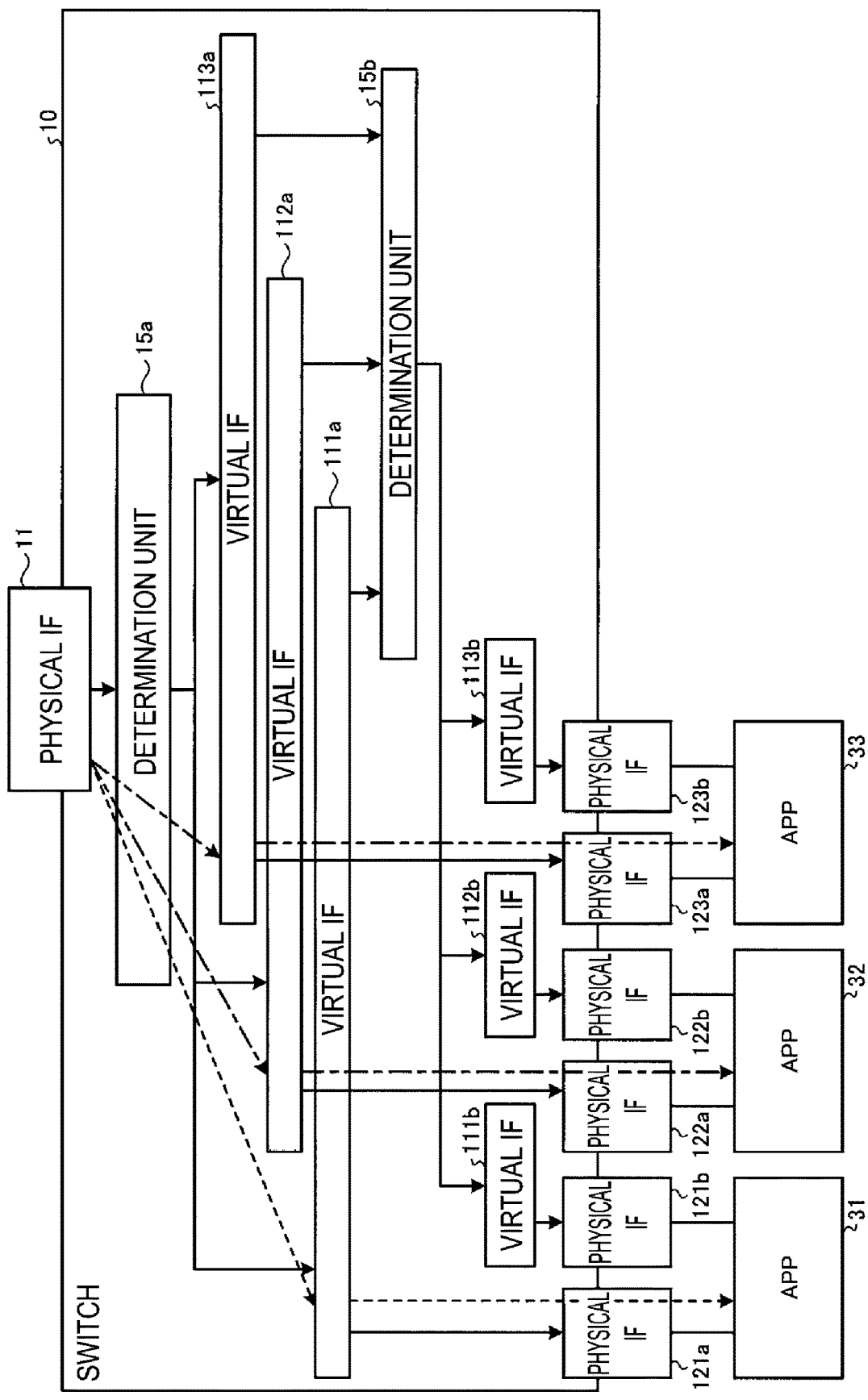
FIG. 13 is a diagram illustrating a flow of traffic during a normal operation.
Figure 14:
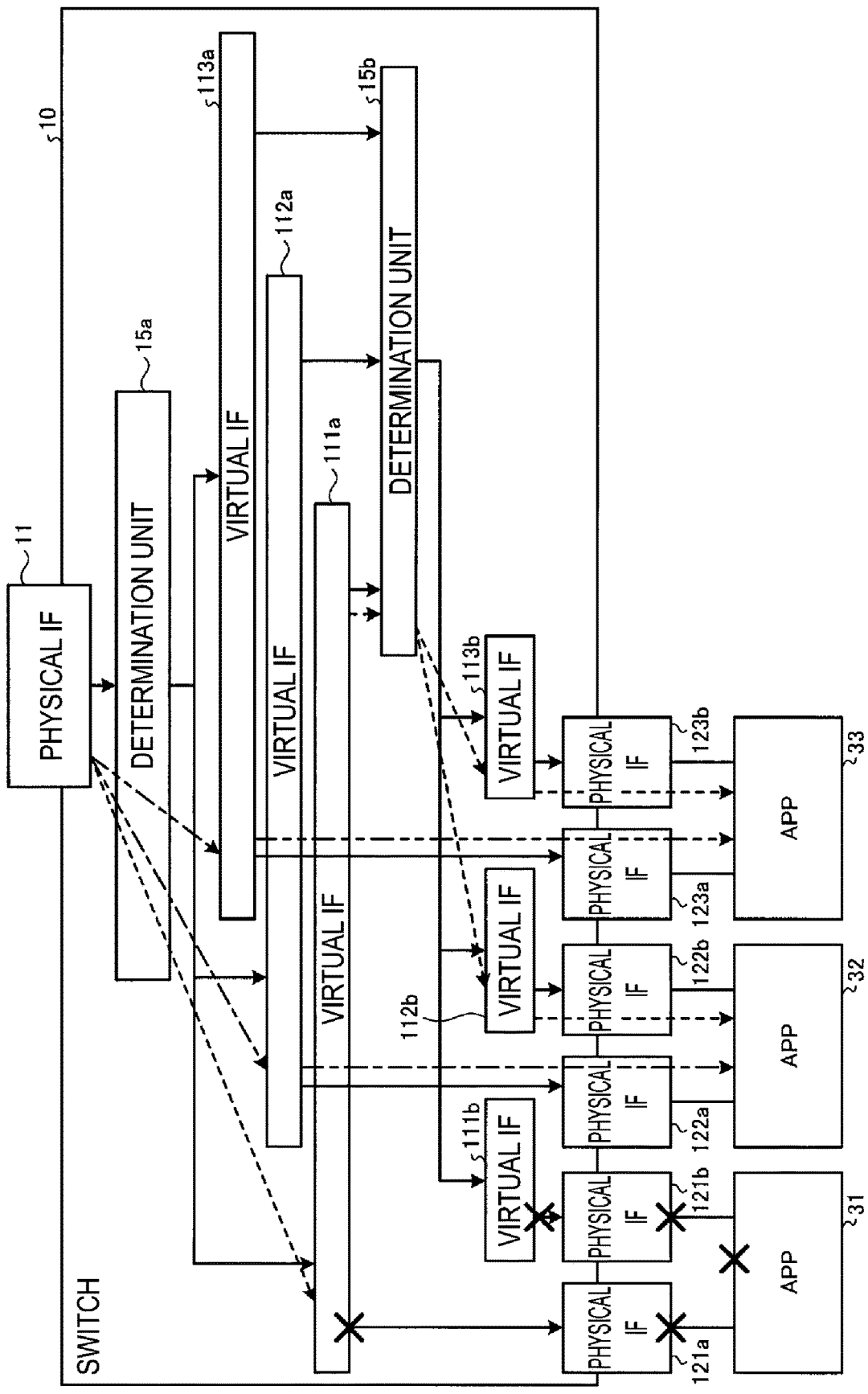
FIG. 14 is a diagram illustrating a flow of traffic when a failure occurs.

A configuration of the switch 10 according to the third embodiment and a flow of traffic will be described with reference to FIGS. 13 and 14. FIG. 13 is a diagram illustrating a flow of traffic during a normal operation. FIG. 14 is a diagram illustrating a flow of traffic when a failure occurs.

As illustrated in FIG. 13, the switch 10 of the third embodiment does not include a physical IF for external loopback. On the other hand, each virtual IF can directly pass the traffic output from the determination unit 15a to the determination unit 15b.

The determination unit 15a determines the device to which the input traffic is transferred, from among a plurality of devices by the hash function. Further, when the first device which is determined to be the transfer destination by the determination unit 15a is available, the switch 10 transfers the traffic to the first device.

For example, as illustrated in FIG. 13, when the APP 31 is determined to be the transfer destination by the determination unit 15a and the APP 31 is available, the virtual IF 111a transfers the traffic to the physical IF 121b. Then, the physical IF 121b transfers the traffic to the APP 31.

On the other hand, as illustrated in FIG. 14, when the APP 31 is determined to be the transfer destination by the determination unit 15 and the APP 31 is not available due to a failure or the like, the virtual IF 111a transfers the traffic to the determination unit 15b.

When the first device is not available, the determination unit 15b determines the device to which the traffic is transferred, from among the available devices by the hash function. Then, the switch 10 transfers the traffic to the second device which is determined to be the transfer destination by the determination unit 15b.

In the example of FIG. 14, the determination unit 15b determines the device to which the traffic transferred by the switch 10 is transferred, from among the devices, that is, the APP 32 and the APP 33 obtained by excluding the APP 31 from a plurality of devices by the hash function. Then, the physical IF 222 or the physical IF 223 transfers the traffic to the APP 32 or the APP 33 which is determined to be the transfer destination by the determination unit 25.

Modified Example of Third Embodiment

Figure 15:
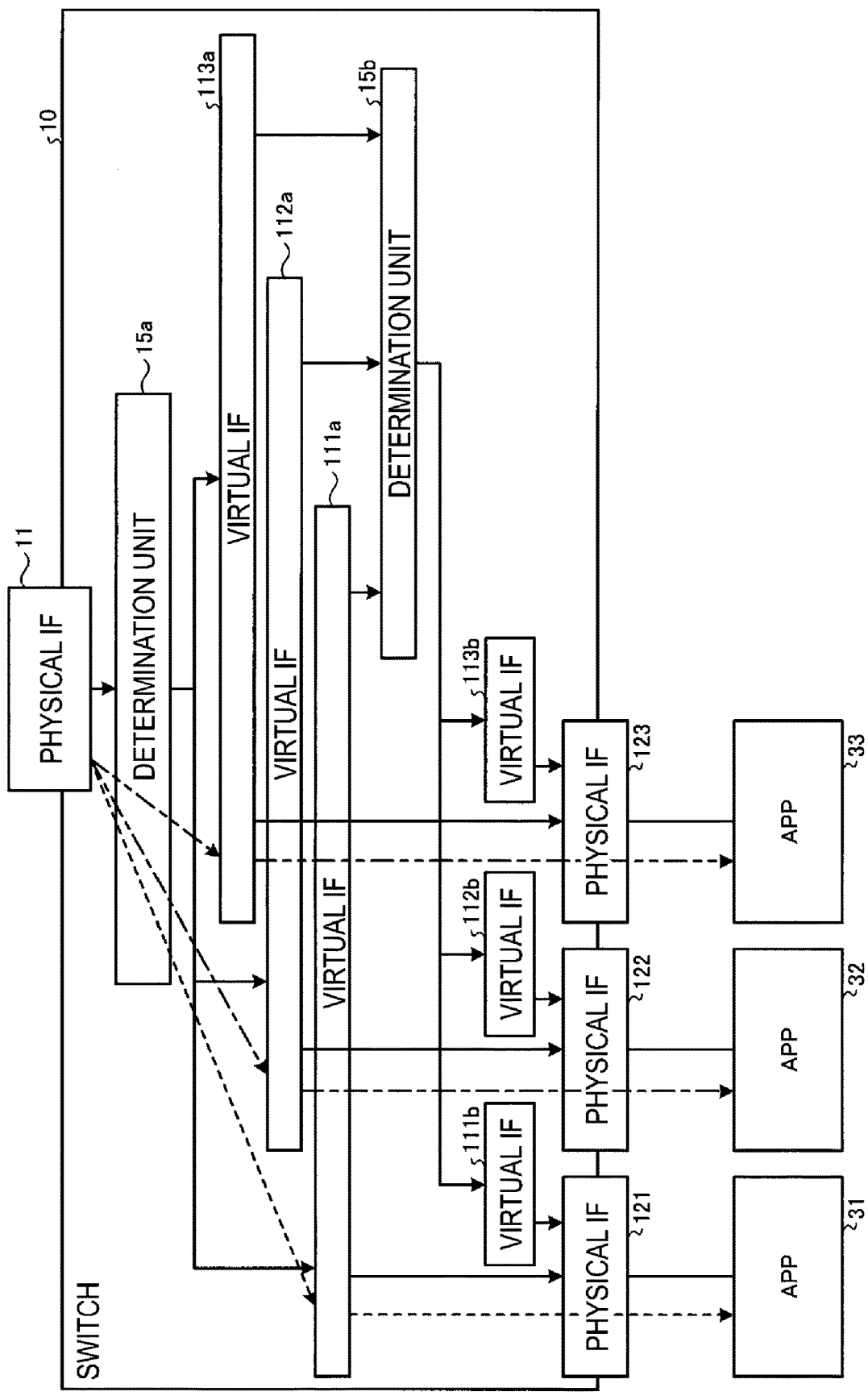
FIG. 15 is a diagram illustrating a flow of traffic during a normal operation in a modified example.
Figure 16:
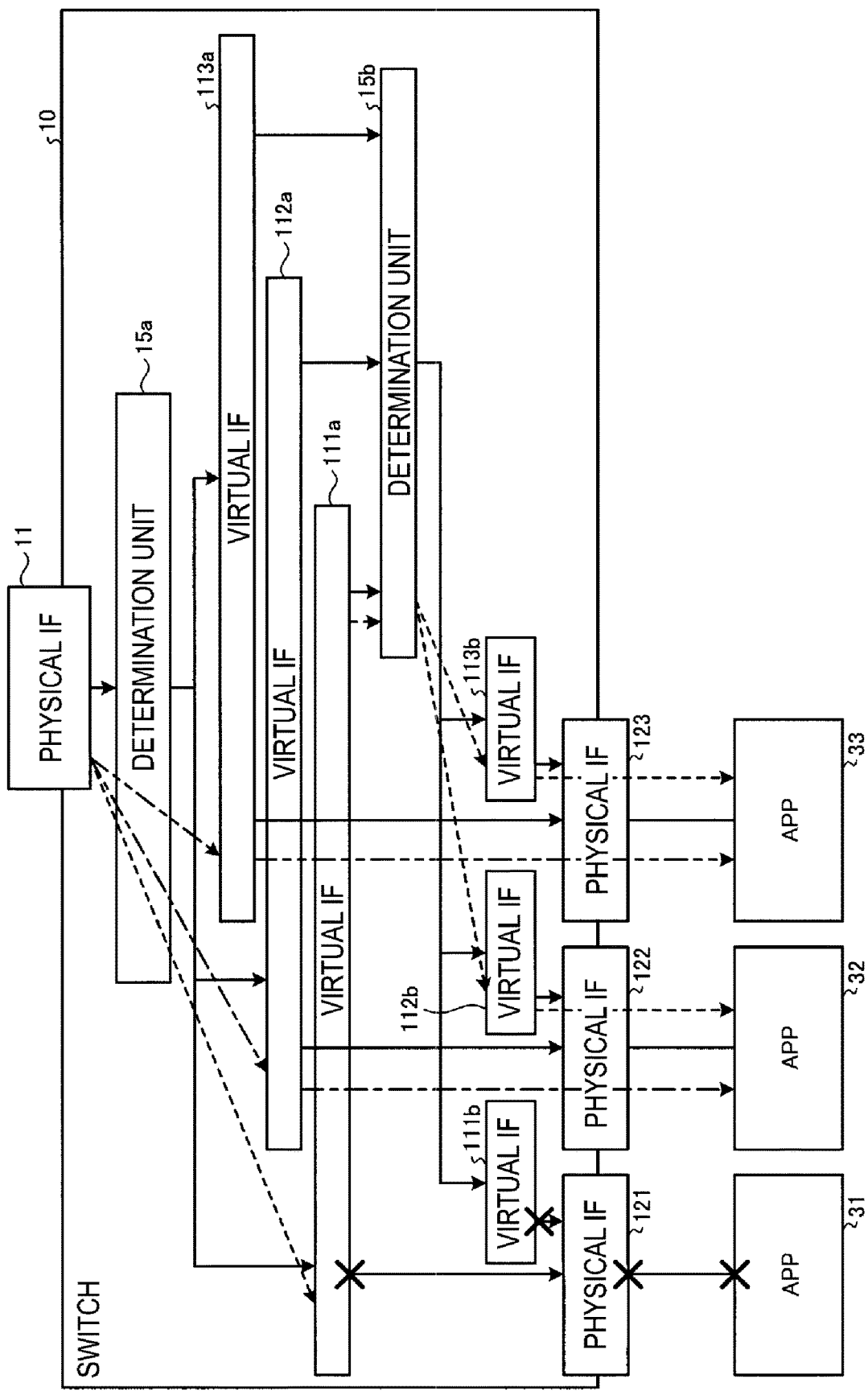
FIG. 16 is a diagram illustrating a flow of traffic when a failure occurs in the modified example.

As illustrated in FIGS. 15 and 16, also in the third embodiment, the same modified example as the second embodiment is considered. As illustrated in FIG. 15, one physical IF may be provided between the switch 10 and each appliance device. FIG. 15 is a diagram illustrating a flow of traffic during a normal operation in the modified example. As illustrated in FIG. 15, the switch 10 includes the physical IFs 121, 122, and 123 in addition to the physical IF 11.

In this case, as illustrated in FIG. 16, the switch 10 transfers the traffic to each appliance device via the physical IFs 121, 122, and 123 regardless of the normal operation or failure. For example, when the APP 31 is normally operated, the switch 10 transfers the traffic to the APP 31 via the physical IF 121. Further, when a failure occurs in the APP 31, the switch 10 transfers the traffic to the APP 32 or the APP 33 via the physical IF 122 or 123.

Flow of Process of Third Embodiment

Figure 17:
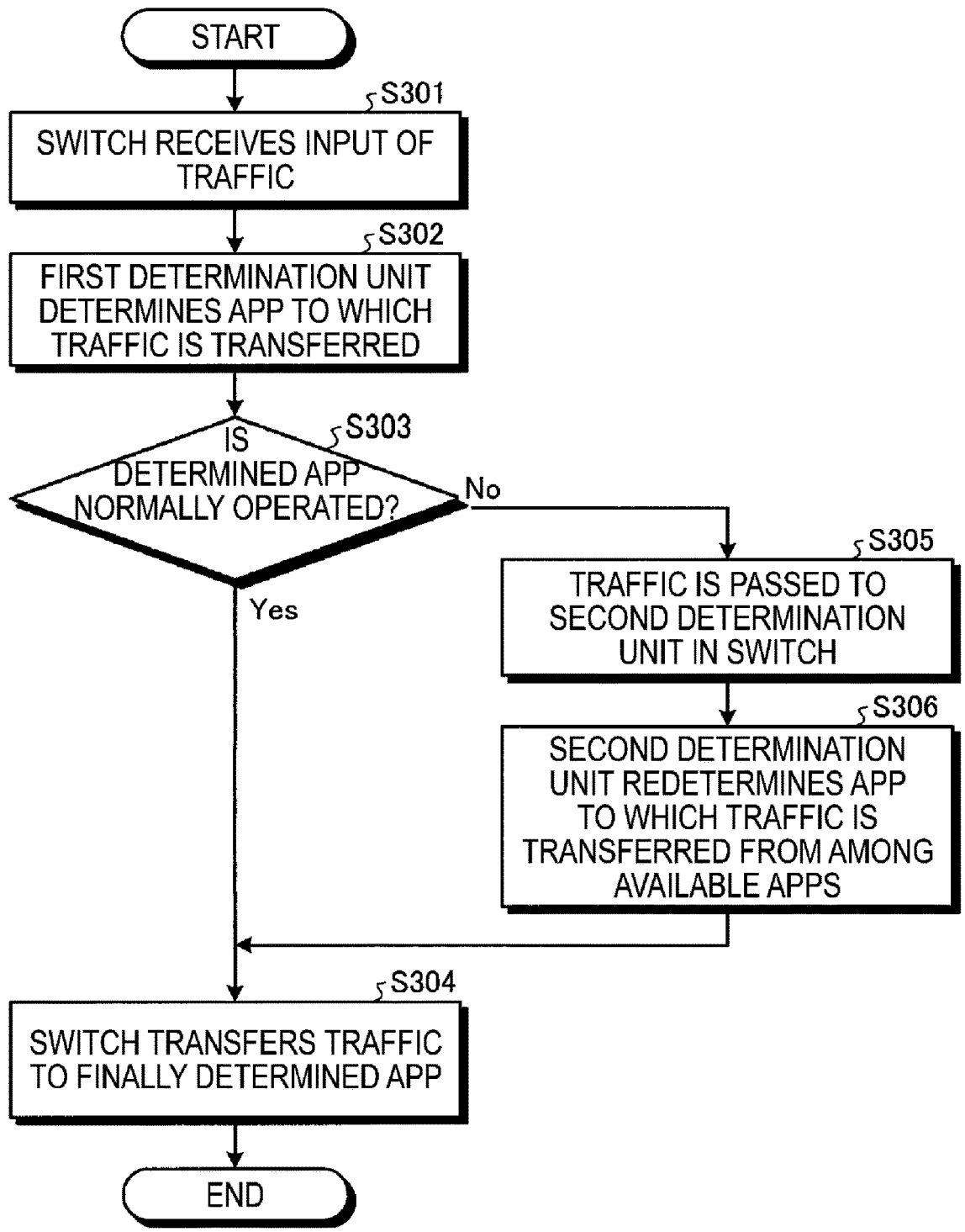
FIG. 17 is a flowchart illustrating a flow of a process of a switch according to a third embodiment.

A flow of a process of the traffic transfer system will be described with reference to FIG. 17. FIG. 17 is a flowchart illustrating a flow of a process of the switch according to the third embodiment.

As illustrated in FIG. 17, first, the switch receives the input of the traffic (step S301). Next, the first determination unit determines the appliance device (APP) to be the transfer destination by the hash function (step S302). Here, when the determined APP is normally operated (step S303, Yes), the switch transfers the traffic to the finally determined APP (step S304). Additionally, the finally determined APP is the APP determined in step S302 or the APP redetermined in step S306.

On the other hand, when the determined APP is not normally operated (step S303, No), the switch passes the traffic to the second determination unit in the switch (step S305).

Here, the second determination unit redetermines, by the hash function, the APP to be the transfer destination from among the APPs other than the determined APP (step S306). Then, the switch transfers the traffic to the determined or redetermined APP (step S304).

Effect of Process of Third Embodiment

According to the third embodiment, there is an effect that the physical IF can be omitted in addition to the same effect as the second embodiment.

Fourth Embodiment

The embodiments of the traffic transfer system which has been described so far are realized by a physical configuration of the switch. On the other hand, the traffic transfer system may be realized by a CLOS configuration including Spine and Leaf. A traffic transfer system of a fourth embodiment uses the CLOS configuration.

Figure 18:
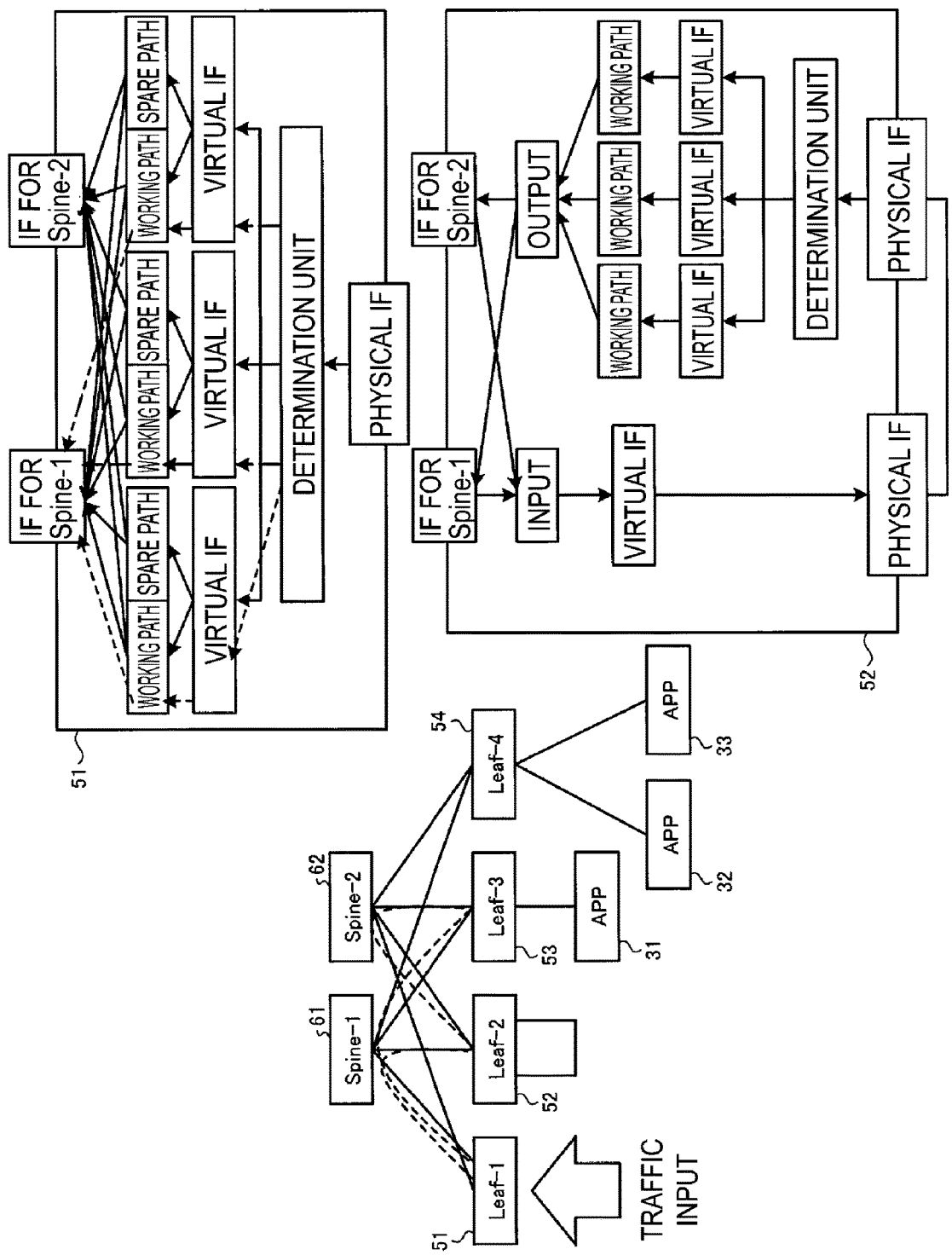
FIG. 18 is a diagram illustrating a flow of traffic during a normal operation at the time of using a CLOS configuration.

FIG. 18 is a diagram illustrating a flow of traffic during a normal operation when the CLOS configuration is used. As illustrated in FIG. 18, the traffic transfer system includes Leafs 51, 52, 53, and 54 and Spines 61 and 62. The Leaf 51 has the same function as the switch 10 of the first embodiment. The Leaf 52 has the same function as the switch 20 of the first embodiment. The Leaf 53 is connected to the APP 31. The Leaf 54 is connected to the APP 32 and the APP 33.

As illustrated in FIG. 18, the traffic transfer system includes a working logical path P1 passing through Leaf 51→Spine 61→Leaf 53, a spare logical path P2 passing though Leaf 51→Spine 61→Leaf 52, and a single logical path P3 in case of failure passing through Leaf 52→Spine 62→Leaf 53. The logical path P1 and the logical path P2 are configured by a LAG configuration. Further, the Spine through which each path passes may be any of the Spines 61 and 62.

A controller (not illustrated) controls each logical path. Further, the Leaf 53 can merge the logical path P1 and the logical path P3 and transfer the traffic to the APP 31 by the same link. When the APP 31 which is determined to be the transfer destination by the determination unit of the Leaf 51 is available, the controller transfers the traffic using the logical path P1.

Figure 19:
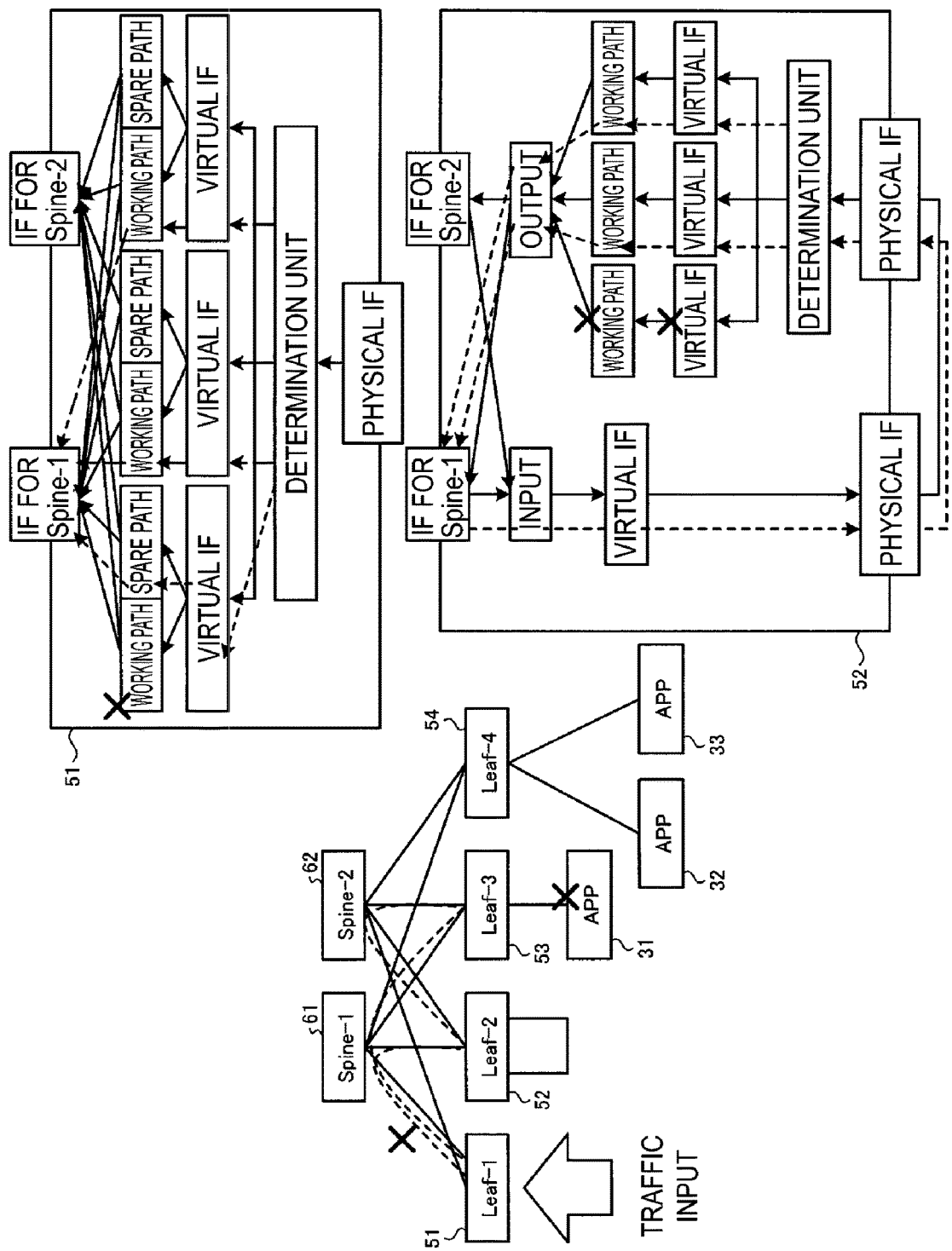
FIG. 19 is a diagram illustrating a flow of traffic when a failure occurs at the time of using the CLOS configuration.

On the other hand, when the APP 31 which is determined to be the transfer destination by the determination unit of the Leaf 51 is not available, the controller closes the virtual IF for the APP 32 in the Leaf 52 and the logical path P1 as illustrated in FIG. 19. FIG. 19 is a diagram illustrating a flow of traffic when a failure occurs at the time of using the CLOS configuration. Accordingly, the traffic which is determined to be transferred to the APP 31 is transferred to the APP 32 or the APP 33 via the logical path P2 and the logical path P3.

In addition, the same logical path is configured for the APP 32 and the APP 33 and the controller can also transfer the traffic to the APP 32 and the APP 33 by the same method as the APP 31.

OTHER EMBODIMENTS

In the embodiments described so far, the physical IF facing the appliance device may be designed, for redundancy, with a plurality of IFs including those for working use and those for spare use. In that case, the spare priority is required to set to the lowest to be selected only when the appliance device is unavailable.

Here, the backward traffic (from the appliance device toward the switch) with respect to the forward traffic transferred from the switch 10 toward the appliance device is transferred via the same IFs as those of the forward traffic. However, in the first embodiment, when the forward traffic passes through the switch 20, the backward traffic may be transferred through the physical IF 122 or the physical IF 123.

System Configuration and Others

Further, each component of each of the illustrated devices is configured with a functional concept and does not necessarily have to be physically configured as illustrated in the drawing. That is, the specific form of distribution and integration of each device is not limited to the one illustrated in the drawing and all or part of them can be functionally or physically distributed or integrated in arbitrary units according to various loads, usage conditions, and the like. Further, all or part of each processing function performed by each device may be realized by a CPU and a program analyzed and executed by the CPU or may be realized as hardware by wired logic.

In addition, all or some of the processes described as being performed automatically among the processes described in this embodiment can be performed manually, or all or some of the processes described as being performed manually can be performed automatically by a known method. Furthermore, the processing procedures, the control procedures, the specific names, and the information including various types of data and parameters described in the present specification and the drawings can be optionally changed unless otherwise mentioned.

REFERENCE SIGNS LIST

10, 20 Switch
31, 32, 33, 34, 35 APP
15, 15*a*, 15*b*, 25 Determination unit
11, 16*a*, 16*b*, 121, 121*a*, 121*b*, 122, 122*a*, 122*b*, 123, 123*a*, 123*b*, 130, 131, 132, 133, 210, 211, 212, 213, 221, 222, 223 Physical IF 111, 111a, 111b, 112, 112a, 112b, 113, 113a, 113b Virtual IF
51, 52, 53, 54 Leaf
61, 62 Spine

The invention claimed is:

1. A traffic transfer system configured to distribute and transfer traffic of communication on a network to a plurality of devices, the traffic transfer system comprising:
a first switch;
a second switch; and
a controller configured to control a logical path provided to transfer traffic between the first switch, the second switch, and the plurality of devices,
wherein the first switch includes:
a first determination unit, implemented using one or more computing devices, configured to determine, from among the plurality of devices by a hash function, a device to which input traffic is transferred; and
a first transfer unit, implemented using one or more computing devices, configured to, based on a first device that is the device determined to be a transfer destination by the first determination unit being available, transfer the traffic to the first device, the first transfer unit being configured to transfer the traffic to the second switch based on the first device being unavailable,
wherein the second switch includes:
a second determination unit, implemented using one or more computing devices, configured to determine, from among available devices by a hash function, a device to which the traffic transferred by the first transfer unit is transferred; and
a second transfer unit, implemented using one or more computing devices, configured to transfer the traffic to a second device that is the device determined to be a transfer destination by the second determination unit, and
wherein the controller is implemented using one or more computing devices configured to, based on the first device determined to be the transfer destination by the first determination unit being unavailable, close a first logical path between the first switch and the first device and a second logical path between the second switch and the first device.

2. A switch comprising:
a first determination unit, implemented using one or more computing devices, configured to determine, from among a plurality of devices by a hash function, a device to which input traffic is transferred;
a first transfer unit, implemented using one or more computing devices, configured to, based on a first device that is the device determined to be a transfer destination by the first determination unit being available, transfer the traffic to the first device;
a second determination unit, implemented using one or more computing devices, configured to determine, from among available devices by a hash function, a device to which the traffic is transferred based on the first device being unavailable; and
a second transfer unit, implemented using one or more computing devices, configured to transfer the traffic to a second device that is the device determined to be a transfer destination by the second determination unit,
wherein, based on the first device determined to be the transfer destination by the first determination unit being unavailable, a first logical path between the first transfer unit and the first device and a second logical path between the second transfer unit and the first device are closed.

3. The switch according to claim 2, further comprising:
a first physical interface implemented using one or more computing devices; and
a second physical interface, implemented using one or more computing devices, configured to receive traffic output from the first physical interface,
wherein the first transfer unit is configured to, based on the first device being unavailable, output the traffic from the first physical interface, and
wherein the second determination unit is configured to determine a device to which (i) the traffic output from the first physical interface and (ii) input to the second physical interface is transferred.

4. A traffic transfer method performed in a traffic transfer system, the traffic transfer system, implemented using one or more computing devices, including a first switch and a second switch and being configured to distribute and transfer traffic of communication on a network to a plurality of devices,
the method comprising:
determining, by the first switch, from among the plurality of devices by a hash function, a first device to which input traffic is transferred;
transferring, by the first switch based on a first device that is the device determined to be a transfer destination being available, the traffic to the first device, and transferring, based on the first device being unavailable, the traffic to the second switch;
determining, by the second switch, from among available devices by a hash function, a second device to which traffic transferred in the transfer performed by the first switch is transferred;
transferring, by the second switch, the traffic to the second device; and
closing, based on the first device determined to be the transfer destination being unavailable, a first logical path between the first switch and the first device and a second logical path between the second switch and the first device.

* * * * *